United States Patent [19]

Susini et al.

[11] Patent Number: 4,902,269
[45] Date of Patent: Feb. 20, 1990

[54] DEVICE FOR THE SEALING OF A PORT OR FITMENT ON A THERMOPLASTIC FILM

[75] Inventors: Etienne Susini, Villecresnes, France; Pierre Soubrier, Brussels, Belgium

[73] Assignee: Baxter International Inc., Deerfield, Ill.

[21] Appl. No.: 155,924
[22] PCT Filed: May 20, 1987
[86] PCT No.: PCT/FR87/00170
 § 371 Date: Mar. 2, 1988
 § 102(e) Date: Mar. 2, 1988
[87] PCT Pub. No.: WO87/07205
 PCT Pub. Date: Dec. 3, 1987

[30] Foreign Application Priority Data
May 21, 1986 [FR] France ............................ 86 07206

[51] Int. Cl.4 .................. B31B 1/84; B31B 21/90; B65H 37/04
[52] U.S. Cl. ..................................... 493/380; 493/341; 493/213
[58] Field of Search ............... 493/210, 213, 341, 343, 493/345, 380

[56] References Cited
U.S. PATENT DOCUMENTS

| 2,981,443 | 4/1961 | Baldwin . |
| 3,069,303 | 12/1962 | Scholle . |
| 3,166,459 | 1/1965 | Imhof . |
| 3,244,576 | 4/1966 | Swartz . |
| 3,283,671 | 11/1966 | Campbell . |
| 3,313,456 | 4/1967 | Parish et al. . |
| 3,334,466 | 8/1967 | Scholle . |
| 3,355,340 | 11/1967 | Calvert et al. . |
| 3,389,643 | 6/1968 | Lemcke et al. . |
| 3,720,141 | 3/1973 | Stock .................. 493/342 |
| 3,783,080 | 1/1974 | Goglio . |
| 3,812,572 | 5/1974 | Weikert . |
| 3,821,046 | 6/1974 | Runge . |
| 3,894,381 | 7/1975 | Christine et al. . |
| 4,055,032 | 10/1977 | Hammond . |
| 4,120,134 | 10/1978 | Scholle . |
| 4,246,062 | 1/1981 | Christine . |
| 4,292,118 | 9/1981 | Wyslotsky . |
| 4,359,361 | 11/1982 | Wright . |
| 4,510,737 | 4/1985 | Ellert . |
| 4,568,321 | 2/1986 | Gaubert . |

FOREIGN PATENT DOCUMENTS

| 1536095 | 12/1969 | Fed. Rep. of Germany . |
| 1291649 | 3/1962 | France . |
| 2162773 | 7/1973 | France . |
| 7507768 | 6/1975 | Netherlands . |
| 993901 | 6/1965 | United Kingdom . |
| 2074934 | 5/1984 | United Kingdom . |

Primary Examiner—Frederick R. Schmidt
Assistant Examiner—Jack Lavinder
Attorney, Agent, or Firm—Paul E. Schaafsma; Robert M. Barrett; Paul C. Flattery

[57] ABSTRACT

Device for welding a mouthpiece to a thermoplastic film comprising a frame, a support plate carried by the frame and moveable with respect to the latter, a welding head rigidly connected to the support plate, and at least one annular heating resistance carried by the welding head and having electric supply rods arranged at two diametrically opposite points. The device comprises diffusion means for diffusing a cooling gas at the vicinity of the fixation of the supply rods to the heating resistance; preferably, the cooling gas diffusion means comprise channels extending in the welding head and surrounding the supply rods.

The invention also relates to the mounting of the welding device on a moveable frame and its association with a film blocking device.

18 Claims, 5 Drawing Sheets

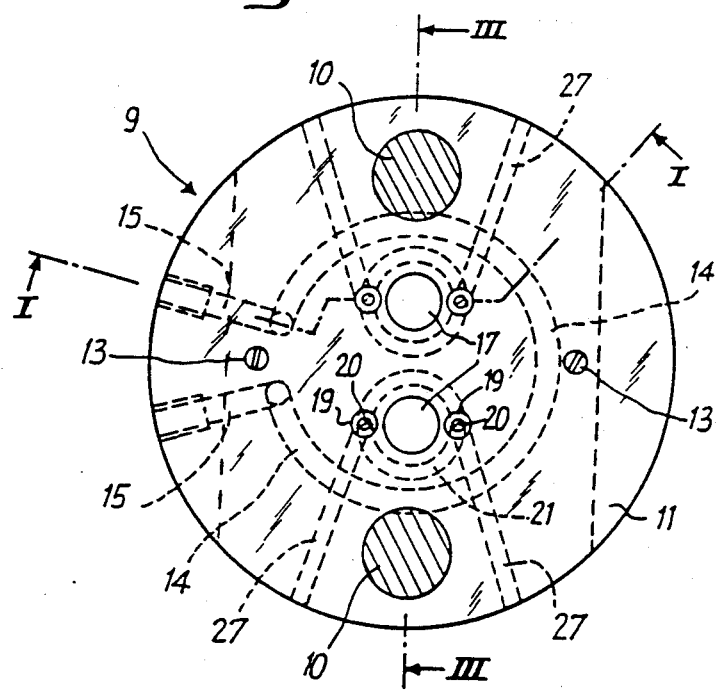
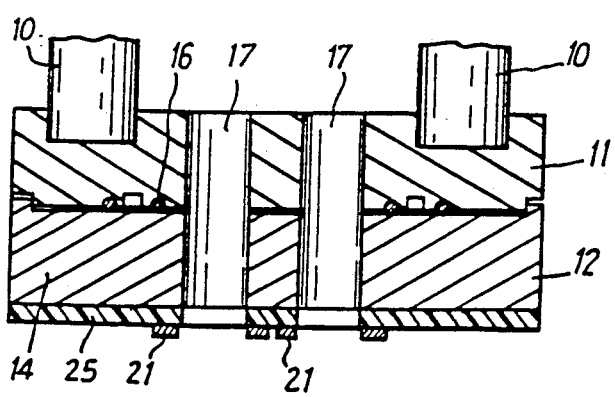
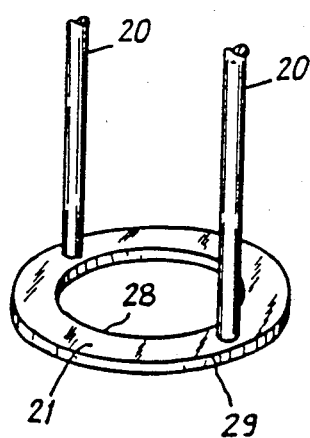

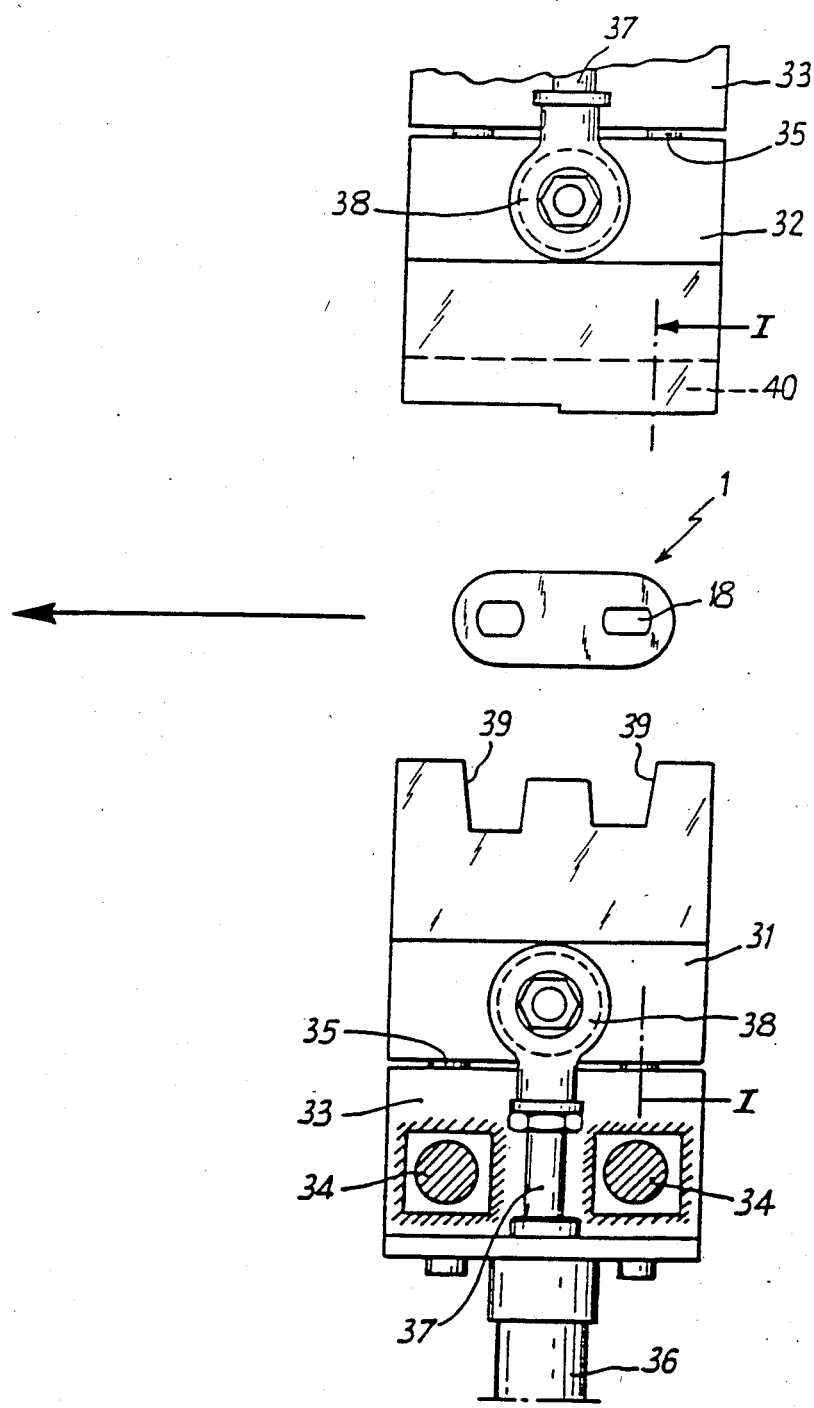

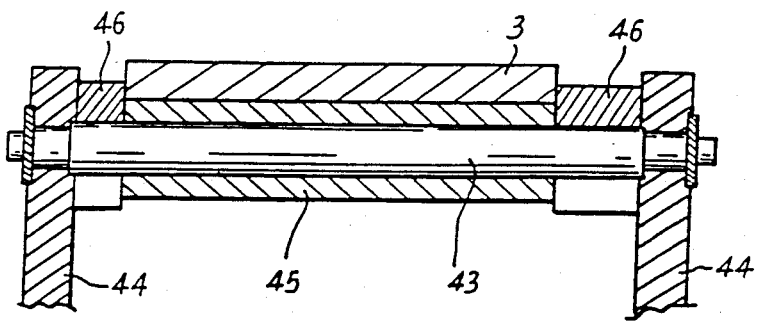
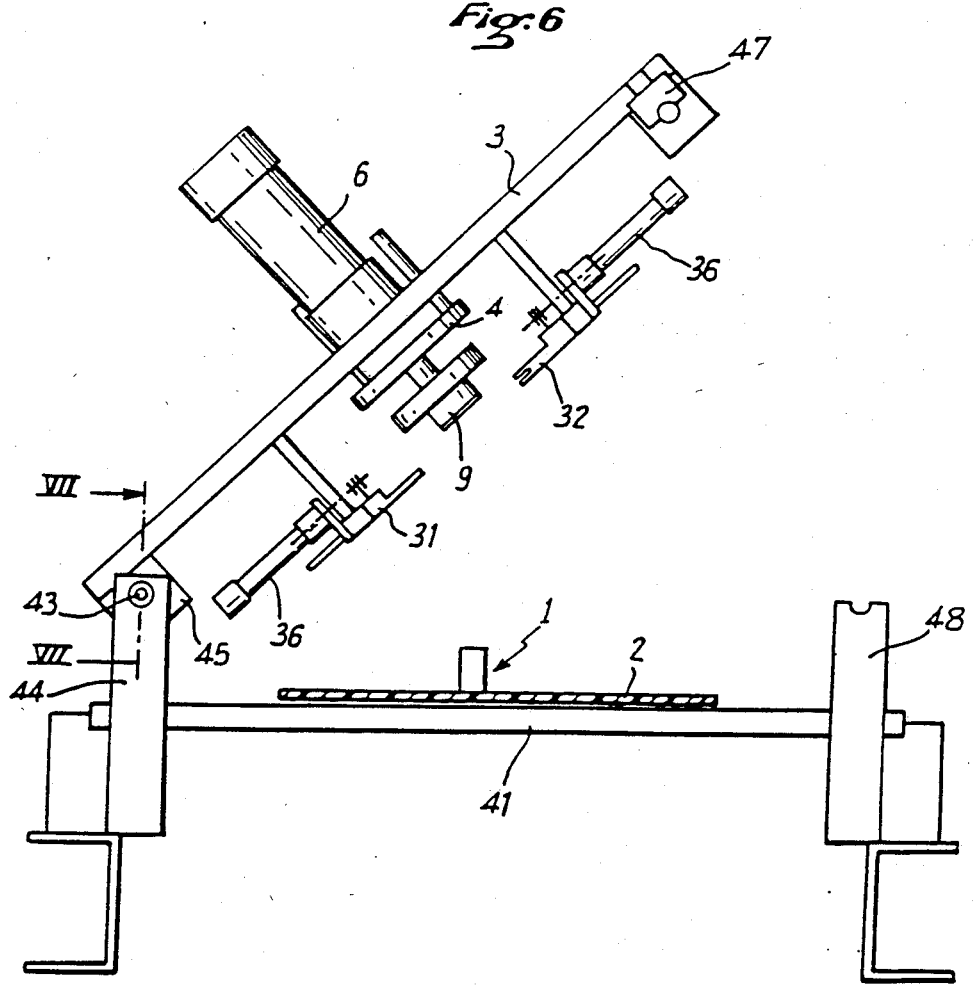

DEVICE FOR THE SEALING OF A PORT OR FITMENT ON A THERMOPLASTIC FILM

BACKGROUND OF THE INVENTION

The present invention relates to a device for sealing a port or fitment on a thermoplastic film.

There are well known machines for manufacturing pouches or bags having a port or fitment constructed from a thermoplastic film. In one step of the manufacturing process of such bags, the ports or fitments must be sealed on the thermoplastic film, generally perpendicular to perforations which have previously been made in the film. The sealing of the port or fitment on the film may be done either by ultrasound, or by a sealing member that is continuously heated, or even by means of a heating resistance intermittently fed an electric current.

In an embodiment of the invention, the present invention relates to a sealing device that includes a welding head with a heating resistance intermittently fed an electric current, and more specifically a ring-shaped heating resistance designed to create a circular seal, for an electric current around a tubular member of the port or fitment to be fixed on the thermoplastic film. In that case, the ring-shaped heating resistance is fed an electric current by means located at two diametrically opposed points. In known devices, an overheating generally occurs at a level of connection between the current supply means and the heating resistance, so a high risk exists that thermoplastic material will be deposited on the heating resistance. This causes a gumming up of the heating resistance and the necessity of an intervention.

SUMMARY OF THE INVENTION

A first purpose of the present invention is to provide a sealing device with a heating resistance having a structure such that it permits a homogenous heating during the feeding of electric current, in order to achieve a high quality feeding of electric current, in order to achieve a high quality seal without any deposit of thermoplastic material on the heating resistance.

Furthermore, in existing devices, the port or fitment is not always suitably positioned with respect to the welding head, so that a risk exists of crushing the port or fitment during the sealing operation.

Another purpose of the present invention is to ensure a precise, relative positioning of the ports or fitments with respect to the welding head.

To accomplish these ends, there is proposed, according to the present invention, a device for sealing a port or fitments on a thermoplastic film that includes a chassis, a support plate attached to the chassis and movable relative to the chassis, a welding head rigidly connected to the support plate, at least one ring-shaped heating resistance carried by the welding head and having electric current feeding rods in two diametrically opposed points, and means for diffusing a cooling gas near the fixation of the feeding rods on the heating resistance.

In that way, the cooling gas regulates the temperature in a point of the heating resistance that is directly acted upon.

In a preferred embodiment of the invention, the means for the diffusion of the cooling gas includes ducts that extend inside the welding head and surround the feeding rods. In that way, the cooling gas ensures not only a regulating of temperature near the fixation point of the feeding rods, but also the cooling of the feeding rods themselves.

According to a further embodiment of the invention, the sealing device includes positioning means located below the welding head. The welding head has cavities facing the positioning means, and preferably, the positioning means includes movable jaws carried by consoles connected to the chassis and maneuvered by means of jacks. In this way, the ports or fitments are positioned in a precise manner immediately prior to the sealing as the ports or fitments are maintained in position by the positioning means until the time when a part of the ports or fitments is received in the cavities of the welding head.

According to still another embodiment of the present invention, the chassis is mounted on a pivoting shaft carried by a chassis adjacent to the film. The pivoting shaft extends parallel to one edge of the film. In that way, when it is desired to proceed to an intervention of the sealing device, the entire chassis with the members mounted on it is rotated around a pivoting shaft and the intervention is done on the welding head without the danger of contaminating the film.

Other characteristics and advantages of the invention will be apparent from a reading of the following detailed description of the presently preferred embodiments and the attached drawings.

BRIEF DESCRIPTION OF THE DRAWINGS

FIG. 2 is a cross-sectional top view of the welding head along line II—II in FIG. 1.

FIG. 3 is a cross-sectional view of the welding head taken along line III—III in FIG. 2.

FIG. 4 is a perspective view of the heating resistance with its feeding rods.

FIG. 5 is a top view of the positioning means taken along line V—V in FIG. 1.

FIG. 6 is an elevated side view in reduced scale of the entire apparatus.

FIG. 7 is an enlarged cross-sectional view taken along line VII—VII in FIG. 6.

DESCRIPTION OF THE PRESENTLY PREFERRED EMBODIMENTS

Figure 1:
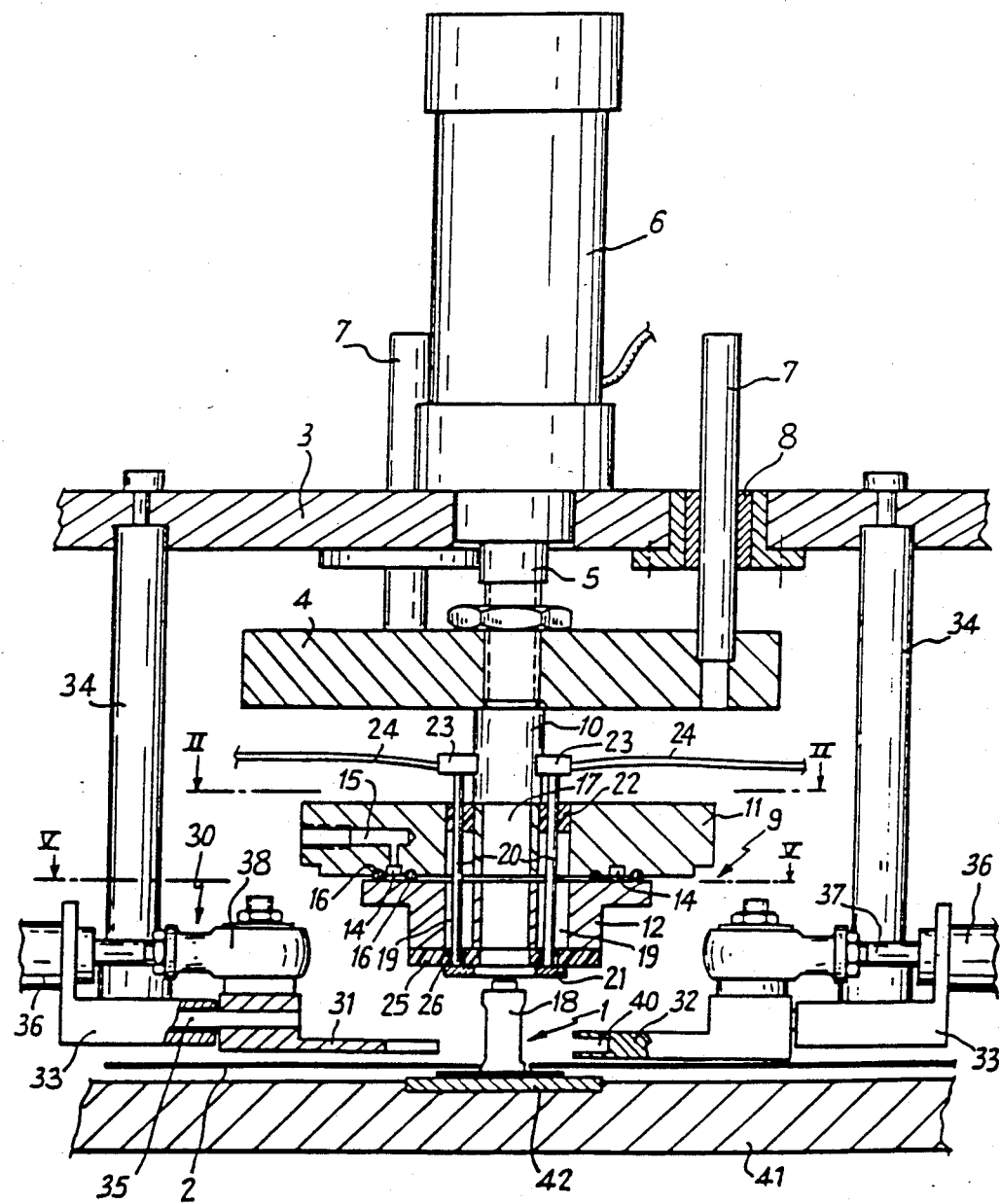
FIG. 1 is a cross-sectional side view of a sealing device according to the principles of the present invention along line I—I in FIGS. 2 and 5.

Referring to the figures, a sealing device constructed in accordance with the principles of the present invention is designed to seal ports or fitments 1 on a thermoplastic film 2. The device includes a chassis 3 formed by a plate that extends above the film in a direction transverse to the direction of the film. A support plate 4 is supported by chassis 3 by means of a stem 5 of a double acting jack 6. During the movements of the jack stem 5, the support plate 4 is guided by three guiding rods 7 fixed to support plate 4 so as to form a triangle around the jack stem 5, and sliding inside sockets 8 supported by chassis 3.

A welding head 9 is rigidly connected to the support plate 4 around the jack stem 5 and sliding in sockets 8 supported by chassis 3.

The welding head 9 is rigidly connected to the support plate 4 by cross pieces 10.

In the preferred embodiment illustrated, the welding head includes an upper part 11 and a lower part 12 connected together by screws 13. The upper part 11 has in its lower face a groove 14 shaped as an arc of a circle, the ends of which are connected to channels 15 for the feeding of the cooling fluid. The channels 15 are pierced in the upper part 11 of the welding head 9 and open on one side of the upper part 11. Groove 14 preferably is surrounded by O-rings 16 which ensure a good seal with respect to the outside.

Near its center, the welding head 9 has two borings 17 that run through its upper part 11 and through its lower part 12. Borings 17 have a diameter slightly larger than that of tubular portions 18 of the ports or fitments 1. The borings 17 serve as guides for the tubular portions 18 during the descending movement of the welding head 9.

On each side of each boring 17 the welding head 9 has vertical channels 19 inside which are the feeding rods 20 of a ring-shaped heating resistance 21. Each channel 19 is closed at its upper end by an electrically insulating sleeve 22 through which extends the feeding rod 20. At their upper part the feeding rods 20 are coupled by means of connectors 23 to a conductor cable 24 for feeding electrical current.

At its lower portion, the welding head 9 has a plate 25 affixed to its lower part 12 by, for example, gluing, and made of a material that will not bond with the material forming the thermoplastic film 2 nor the ports or fitments 1. The plate 25 is pierced with openings which are aligned with and have dimensions equal to the borings 17. The plate 25 also has openings facing channels 19. Openings 26 preferably have a dimension slightly greater than the dimension of the feeding rods 20, but slightly smaller than the width of the ring-shaped resistance 21.

The vertical channels 19 are connected to a source of cooling fluid (not illustrated), of, for example, refrigerated and filtered air, through channels 27 located in the wall of the lower part 12 of the welding head 9 and opening on the same side (FIG. 2).

As illustrated in FIG. 4, the feeding rods 20 preferably have a diameter slightly smaller than the width of the ring-shaped heating resistance 21, and they are affixed to the latter in a direction transverse to the direction of its upper face, preferably at mid-point between its internal edge 28 and its external edge 29. The feeding rods 20 are affixed to the heating resistance 21 in two diametrically opposed points on that resistance 21. When the heating resistances, which here are two in number, are fixed on the welding head 9, they each surround one of the vertical borings 17.

Below the welding head 9, the device has positioning means 31. The positioning means 30, illustrated in detail in FIGS. 1 and 5, in their open position, include positioning jaws 31 and 32, each of which is mounted to move on a console 33 that is connected to chassis 3 by small columns 34. The movement of the jaws 31 and 32, relative to consoles 33, is guided by guiding rods 35 that extend in horizontal borings of the consoles 33. Each one of the consoles 33 also has a jack 36 with a stem 37 extending horizontally, and is connected to the upper part of one of the jaws 31 and 32 by a swivel joint 38. Jaw 31 has a heel on which is fixed the end of the jack stem 37, and a thin plate that extends horizontally toward the tubular portions 18 of the port or fitment 1 located under the welding head 9. That thin plate has notches 39 which, when the positioning means 30 are closed, come to rest against the tubular portions 18 and surround them. The jaw 32 includes, in a similar manner, a heel on which the end of the jack stem 37 is fixed and a fore part including a groove 40 into which the end of the thin plate of the jaw 31 is positioned during the closing of the positioning means 30.

Below the positioning means 30, the device preferably has a counterplate 31 having, perpendicular to the port or fitment 1, a piece of anti-adhesive material 42.

In order to permit an intervention on the sealing device without risking polluting the thermoplastic film 2 which is in position, the chassis 3 preferably, as illustrated in FIG. 6, is pivotally mounted on a pivoting shaft 43 supported by a frame element 44 adjacent to film 2. The pivoting shaft 43 extends in a direction parallel to the edge of film 2. Chassis 3 is preferably mounted on the pivoting shaft 43 by means of a small beam 45 pierced with a longitudinal boring, as shown in FIG. 7. The width of chassis 3 is preferably smaller than the distance between the elements of frame 44, so that it can be moved in translation on the pivoting shaft 43 in a direction parallel to that shaft 43. The precise positioning of chassis 3 is ensured by inverted U-shaped blocks 46. The thickness of each one of the blocks 46 corresponds to the desired position for chassis 3. At its end, opposite the pivoting shaft 43, chassis 3 has elements 47 for its fixation on frame elements 48 located facing frame elements 44 to maintain chassis 3 in position at both of its ends.

To this end, the device according to the present invention, functions in the following manner. The chassis 3 is first positioned, using the appropriate blocks 46, so that the welding head 9 will be located above the precise position where the ports or filments 1 will rest one by one during the step by step forward movement of film 2. The step by step forward movement is obtained by means independent from the welding head 9 and is not illustrated. When a port or fitment 1 reaches the sealing station, the jaws 31 and 32 are first closed by the action of the jack 6. The ports or fitments 1 are then accurately positioned and jack 6 is set into action to lower welding head 9 in the first phase of operation. As soon as the upper part of the tubular portions 18 of a port or fitment 1 is within the vertical borings 17 of the welding head 9, the jaws 31 and 32 are removed in order not to hinder the subsequent downward movement of the welding head 9. The movement of the welding head 9 continues until the heating resistances 21 come in contact with the thermoplastic film 2. An electrical impulse is sent into the electric cables 24, to send a current between the feeding rods 20 and thus cause the heating of heating resistance 21 and the partial fusion of the thermoplastic film 2 with the base of the port or fitment 1. During the sealing operation, a cooling liquid is injected through one of the feeding channels 15. It exits through the other feeding channel 15 after having circulated through the arc-shaped groove 14. This prevents the welding head 9 from being heated to too great a temperature. Additionally, filtered and refrigerated air is injected through feeding channels 27 and flows around the rods 20 then through the openings 26, because of the play existing between the lower plate 25 and the heating resistance 21. The cooling air functions to cool the juncture between the feeding rods 20 and the heating resistance 21, then it flows over the thermoplastic film 2. After the heating impulse through the heating resistance 21 has stopped, the flow of air through openings 26 serves as a coolant for the heating resistance 21 as well as for the thermoplastic film 2 and the port and fitment 1. This prevents the thermoplastic film 2 from remaining too soft after heating, and from adhering to the heating resistance 21, which would cause the formation of burrs and rough edges when welding head 9 is moved back.

It should be understood from the above, that the positioning means 30 formed by the movable jaws 31 and 32 may be used with other welding heads than described as a preferred embodiment in the present patent application. Specifically, the positioning means 30 may be used with a high frequency welding head 9 having one or several borings for the portion of the ports or fitments 1 which projects relative to the film 2.

Figure 8:
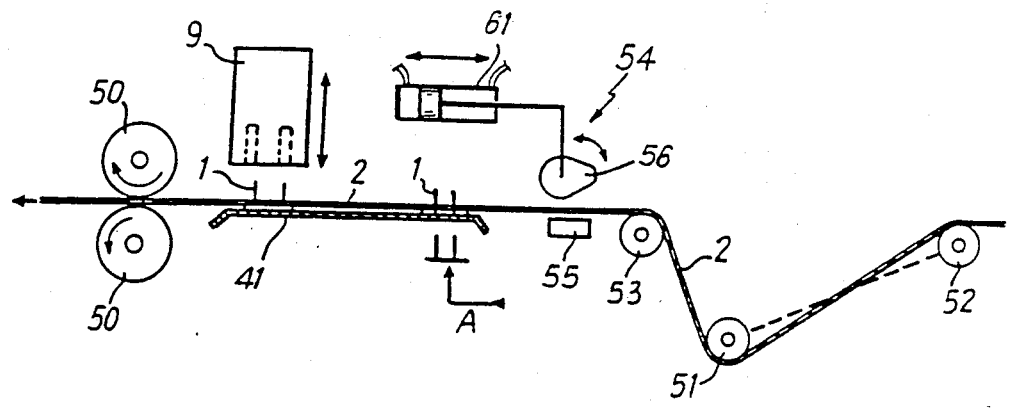
FIG. 8 is a diagramatic side view of a further embodiment of the invention that includes film blocking means.
Figure 9:
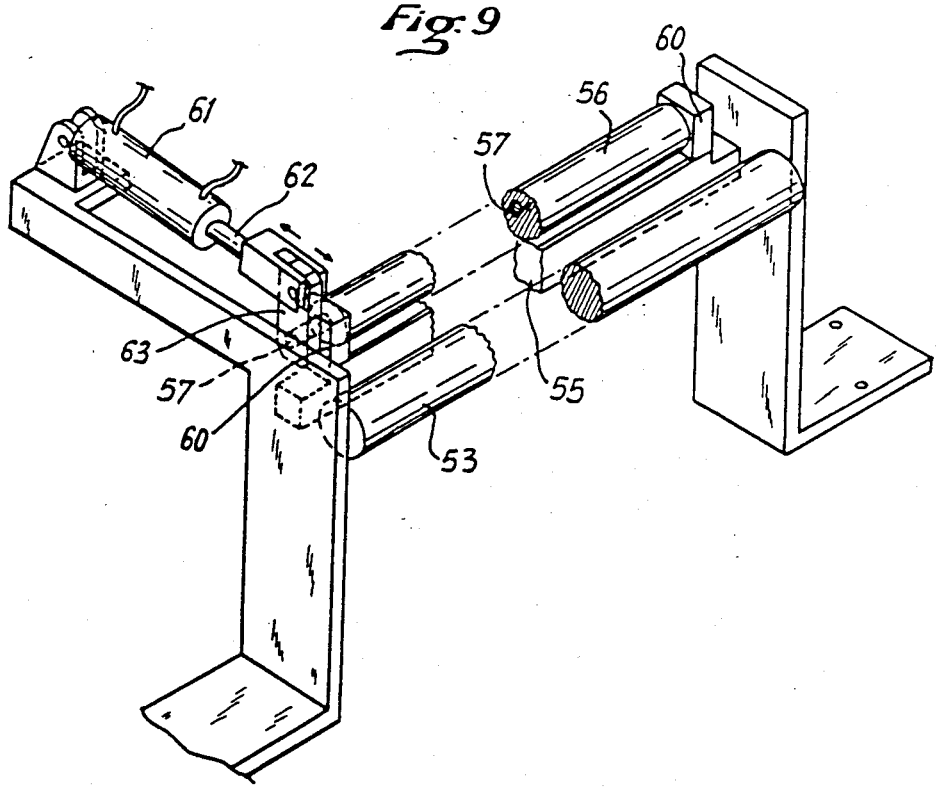
FIG. 9 is a perspective view, partially cut off of the film blocking means.

The FIGS. 8 and 9 illustrate a complementary device, also used for the precise positioning of the ports or fitments 1 at the time of sealing.

FIG. 8 illustrates a sealing device having a welding head 9 under which passes a film 2 equipped with ports or fitments 1 positioned at a feeding station represented by arrows "A". The film 2 is moved downstream from the welding head 9 in a direction of movement of the film, by driving rollers 50 which rotate in an opposite direction and are positioned so that they will pinch the film. The driving rollers are intermittently activated in a conventional manner, and they hold the film 2 motionless downstream from the welding head when they are not activated. During the different movements of the film 2, an even tension is insured upstream of the film 2 by an oscillating tension bar 51 which is mounted upstream from the sealing device, between two rollers 52 and 53 which support the film 2. Roller 53 also functions as a return roller to maintain the upstream portion of the film 2 in the plane of counterplate 41.

Since the film 2 is slightly elastic, there is a risk that the film 2 will become elongated due to the action of tension bar 51. This would hinder the precise positioning of the ports or fitments 1 in a position perpendicular to welding head 9.

To overcome this drawback, the present invention provides film blocking means 54 located upstream from the welding head 9.

FIG. 9 illustrates a preferred embodiment of the blocking means 54. In the illustrated embodiment, the blocking means 54 includes film pinching members formed by a support bar 55 rigidly mounted on one side of the film 2, and an excentric member 56 mounted to pivot on an opposite side of the film 2 between a position remote from the film 2 which is shown in FIG. 8, and a position in contact with the film 2, which is shown in FIG. 9. In the illustrated embodiment, the excentric member 56 is a cylinder eccentrically fixed on a shaft 57 that is mounted on consoles 60 affixed to the frame of the machine. The position of cylinder 56 is determined by a jack 61 carried by the chassis 3 and suitably connected, in a manner not shown, to a governing member associated with the governing system of the driving rollers 50. Stem 62 of the jack 61 is connected to the shaft 57 by a small connecting rod 63 mounted to rotate relative to the shaft 57.

This device functions as follows: when the driving rollers 50 are set into rotation, the small connecting rod 63 is pulled by the jack 61 and the eccentric roller 56 is moved away from the film 2. This permits the film 2 to move forward. As soon as the driving rollers 50 are stopped, the small connecting rod 63 is pushed back and the film 2 is pinched between the eccentric roller 56 and the support bar 55.

It should be understood that the present invention is not limited to the embodiment which has been described, and that it can be subjected to variations which will be apparent to a man skilled in the art. Specifically, although the feeding rods 20 of the welding head 9, for reasons of ease in assembling, have been illustrated perpendicular to the heating resistance 21, their shape and their orientation may be made to fit the assembling requirements on a given welding head. Similarly, although in the illustrated preferred embodiment, the cooling fluid feeding channels 27 are surrounding the rods 20, the welding head 9 may carry a series of nozzles directed toward the juncture point between the feeding rods 20 and the heating resistance 21.

With respect to the mobility in translation of chassis 3, it is possible to replace blocks 46 with a device including a ratchet mechanism provided on one side of pivoting shaft 43 in conjunction with a toothed pinion rigidly attached to chassis 3 and driven into rotation by a wheel.

We claim:

1. A device for sealing a fitment on a thermoplastic film, comprising a chassis, a support plate attached to the chassis and movable with respect to the chassis, a welding head rigidly connected to the support plate, at least one ring-shaped heating resistance which defines an aperture for receiving a portion of the fitment during sealing and is carried by the welding head, means for feeding current to the welding head joined to the welding head at two diametrically opposed points on the welding head, and means for the diffusion of a cooling fluid to the point where the means for feeding current are joined to the heating resistance.

2. A sealing device according to claim 1, wherein the means for diffusion of a cooling fluid include channels that extend into the welding head and surround the means for feeding current.

3. A sealing device according to claim 2, wherein the welding head has an upper part and a lower part connected together, and including means for the circulation of a cooling fluid between the upper part and the lower part.

4. A sealing device according to claim 1, further comprising a pivoting shaft extending in a direction parallel to an edge of the film and the shaft is mounted to the chassis, and a frame adjacent to the film supports the pivoting shaft.

5. A sealing device according to claim 4, wherein the chassis is movable on the pivoting shaft in a direction parallel to the shaft.

6. The device for sealing a fitment on a thermoplastic film of claim 1 wherein the means for the diffusion of a cooling fluid includes means for the circulation of a cooling fluid including a groove having an arc shape formed in a lower face of an upper part of the welding head, and the sealing device further includes feeding channels located in the upper part of the welding head and an opening located at one end of the groove and at the other end of the groove on a side of the upper part.

7. A sealing device according to claim 1, further comprising a film driving means downstream from the welding head and a film blocking means upstream from the welding head relative to a direction of movement of the film.

8. A sealing device according to claim 7, wherein the film blocking means further comprises film pinching members.

9. A device for sealing a fitment on a thermoplastic film, comprising a chassis, a support plate attached to the chassis and movable with respect to the chassis, a welding head rigidly connected to the support plate, at least one ring-shaped heating resistance carried by the welding head, means for feeding current to the welding head located at two diametrically opposed points, means for the diffusion of a cooling fluid to a position where the means for feeding current are fixed on the heating resistance, the means for the diffusion of a cooling fluid including channels that extend into the welding head and surround the means for feeding current, the welding head including an upper part and a lower part connected together, and means for the circulation of a cooling fluid between the upper part and the lower part, the means for the circulation of a cooling fluid includes a groove shaped like an arc of a circle that is formed in the lower face of the upper part of the welding head, and the sealing device further including feeding channels provided in the upper part of the welding head and an opening located at one end of the groove and at the other end of the groove on a side of the upper part.

10. A device for sealing a fitment on a thermoplastic film, comprising a chassis, a support plate carried by the chassis and movable relative to the chassis, and a welding head rigidly connected to the support plate, the welding head includes a vertical guiding boring and a ring-shaped heating resistance that defines an aperture, the ring-shaped heating resistance circumscribing a portion of the vertical guiding boring, the sealing device includes a positioning means located below the welding head, the positioning means being mounted on the chassis, and a pivoting shaft being supported by a frame adjacent to the film, the chassis being mounted and rotatable on the pivoting shaft.

11. A sealing device according to claim 10, wherein the positioning means includes movable jaws supported by consoles connected to the chassis, and further including jacks to maneuver the jaws.

12. A sealing device according to claim 10, herein the chassis is movable on the pivoting shaft in a direction parallel to the shaft.

13. A sealing device according to claim 10, further comprising a film driving means downstream from the welding head and a film blocking means upstream from the welding head relative to a direction of movement of the film.

14. A sealing device according to claim 13, wherein the film blocking means further comprises film pinching members.

15. A device for sealing a fitment on a thermoplastic film, comprising a chassis, a support plate attached to the chassis and movable with respect to the chassis, a welding head rigidly connected to the support plate, at least one ring-shaped heating resistance carried by the welding head, means for feeding current to the welding head located at two diametrically opposed points, means for the diffusion of a cooling fluid to a position where the means for feeding current are fixed on the heating resistance, and including a film driving means downstream from the welding head, a film blocking means, including pinching members, upstream from the welding head relative to a direction of movement of the film, a support bar rigidly mounted in the pinching members on one side of the film, and an eccentric member pivotally mounted on an opposite side of the film to pivot between a position remote from the film and a position in contact with the film.

16. A device for sealing a fitment on a thermoplastic film, comprising: a chassis, a support plate carried by the chassis and movable relative to the chassis, and a welding head rigidly connected to the support plate, the welding head includes a vertical guiding boring and the sealing device includes a positioning means located below the welding head, a film driving means downstream from the welding head, a film blocking means, including pinching members, upstream from the welding head relative to a direction of movement of the film, a support bar rigidly mounted in the pinching members on one side of the film, and an eccentric member pivotally mounted on an opposite side of the film to pivot between a position remote from the film and a position in contact with the film.

17. A device for sealing a fitment to a web of film comprising:
a chassis;
a support plate attached to the chassis and movable with respect to the chassis;
means for sealing the fitment to the film connected to the support plate and including at least one ring-shaped heating member having an aperture for receiving a portion of a fitment during a sealing of the fitment to the film; and
means for cooling at least a portion of the ring-shaped heating member the cooling means including means for circulating a fluid into at least partial contact with the heating member.

18. The device of claim 17 wherein the means for sealing includes two ring-shaped heating members.

* * * * *

UNITED STATES PATENT AND TRADEMARK OFFICE
CERTIFICATE OF CORRECTION

PATENT NO. : 4,902,269

DATED : February 20, 1990

INVENTOR(S) : Etienne Susini and Pierre Soubrier

It is certified that error appears in the above-identified patent and that said Letters Patent is hereby corrected as shown below:

In the title page, the Assignee [73] should additionally include --Prepac, Villejuif, France--

In column 7, at line 45, delete "herein" and substitute --wherein-- therefor.

Signed and Sealed this

Nineteenth Day of May, 1992

Attest:

DOUGLAS B. COMER

*Attesting Officer*     Acting Commissioner of Patents and Trademarks